United States Patent [19]

Folger

[11] 4,350,053

[45] Sep. 21, 1982

[54] FLUID PRESSURE ACTUATING DEVICE

[75] Inventor: Philip M. Folger, Erie, Pa.

[73] Assignee: General Electric Company, Erie, Pa.

[21] Appl. No.: 184,495

[22] Filed: Sep. 5, 1980

[51] Int. Cl.[3] .......... F16H 5/48

[52] U.S. Cl. .......... 74/2; 91/416; 188/170; 188/69; 123/198 D

[58] Field of Search .......... 91/416; 188/69, 170, 188/31; 74/2; 123/378, 198 D, 198 DB; 251/73

[56] References Cited

U.S. PATENT DOCUMENTS

| | | | |
|---|---|---|---|
| 2,580,596 | 1/1952 | Richardson | 74/2 |
| 3,020,094 | 2/1962 | Murty | 188/170 |
| 3,543,603 | 12/1970 | Gley | 74/2 |
| 3,613,515 | 10/1971 | Swander | 188/170 |
| 3,760,785 | 9/1973 | Harrison | 123/198 DB |
| 3,853,110 | 12/1974 | van der Merwe | 251/73 |
| 3,923,020 | 12/1975 | Gilligan | 123/378 |
| 4,108,129 | 8/1978 | Rognon | 123/198 DB |

*Primary Examiner*—Charles J. Myhre
*Assistant Examiner*—Carl Stuart Miller
*Attorney, Agent, or Firm*—Albert S. Richardson, Jr.

[57] ABSTRACT

A movable member, including a first piston in a hydraulic cylinder, is biased toward a first position by a reset spring and toward a second position by a trip spring which is compressed between the first piston and a second piston in the same cylinder. The second piston is disposed for limited floating movement relative to said movable member. Hydraulic fluid under pressure is admitted into a first chamber between the first piston and the adjacent end of the cylinder, and a constricted fluid passage in the movable member enables the hydraulic fluid to flow between the first chamber and a second chamber defined by the second, floating piston and the other end of the cylinder. With equal, relatively high fluid pressure in both chambers, the trip spring is charged and the movable member is held by the reset spring in its first position. An abrupt loss of fluid pressure in the first chamber causes the movable member to be quickly moved by the trip spring to its second position, whereas a gradual loss of fluid pressure results in movement of the second, floating piston in a direction that discharges the trip spring while the movable member remains in its first position.

8 Claims, 3 Drawing Figures

FLUID PRESSURE ACTUATING DEVICE

BRIEF SUMMARY OF THE INVENTION

This invention relates to fluid pressure responsive mechanical actuating means, and more particularly to automatically resettable actuating means responsive to an abrupt change in fluid pressure and automatically resettable under relatively constant pressure conditions whether or not pressure returns to normal.

The invention includes also the use of such an actuator as a latch releasing device for a normally latched expandable link in a diesel engine fuel supply linkage; extension of the link being arranged to shut down the engine in response to an abrupt reduction of hydraulic pressure effected by an overspeed governor. A novel overspeed protective system incorporating such an expandable link is disclosed and claimed by P. M. Folger and B. L. Johnson in their joint U.S. patent application Ser. No. 184,494, still pending, filed concurrently herewith and assigned to the General Electric Company.

Overspeed links of several types heretofore known are shown in U.S. Pat. Nos. 2,580,596 and 3,923,020. These prior art links, however, require that normal hydraulic pressure be restored in order to reset the link.

Accordingly, it is a general objective of this invention to provide a fluid pressure device responsive to an abrupt change in pressure to trip an output or actuating member wherein the output member resets automatically whether or not the fluid pressure returns to normal.

It is another object of the invention to provide a hydraulic pressure responsive latch actuator having an actuating member which is automatically movable to and maintained in a latch effecting state whenever an applied hydraulic pressure is substantially constant or changing slowly and which is movable to an unlatching state in response to a sudden drop in pressure.

In carrying out the invention in one form, a reciprocal latch pin is coupled to an actuating piston and piston rod slidably mounted within a hydraulic cylinder. Within the cylinder the piston rod is provided with an abutment longitudinally spaced from the actuating piston, and an auxiliary or floating piston is slidably mounted on the rod for limited motion between the abutment and the actuating piston. A compression actuating spring between the main and auxiliary pistons biases them to spaced apart relationship on the rod. A reset spring in the cylinder biases the double piston assembly to a latch-effecting position at one end of the cylinder where the rod abutment acts as a limiting stop for the assembly. A port in the other end of the cylinder admits hydraulic fluid under pressure into a first chamber defined by the actuating piston. The floating piston defines a second, blind chamber at the one end of cylinder, and the two chambers are in communication with each other via a constricted fluid passage through the actuating piston and rod. Normally there is sufficiently high hydraulic pressure in both chambers to force the piston into engagement with the actuating piston, thereby charging the actuating spring. In the event of an abrupt pressure drop in the first chamber, the actuating spring quickly moves the actuating piston and rod to an unlatching position while the constriction in the fluid passage delays release of hydraulic pressure in the second chamber. Soon the pressures in both chambers are again equal, whereupon the reset spring will automatically return the double piston assembly to its latch-effecting position.

The present invention further contemplates the combination of such a hydraulic actuator as a latch release device for a spring-actuated manually resetable expandable link normally latched in a contracted condition.

The invention will be more fully understood and its various objects and advantages will be further appreciated by referring now to the following detailed specification taken in conjunction with the accompanying drawings.

DETAILED DESCRIPTION

Figure 1:
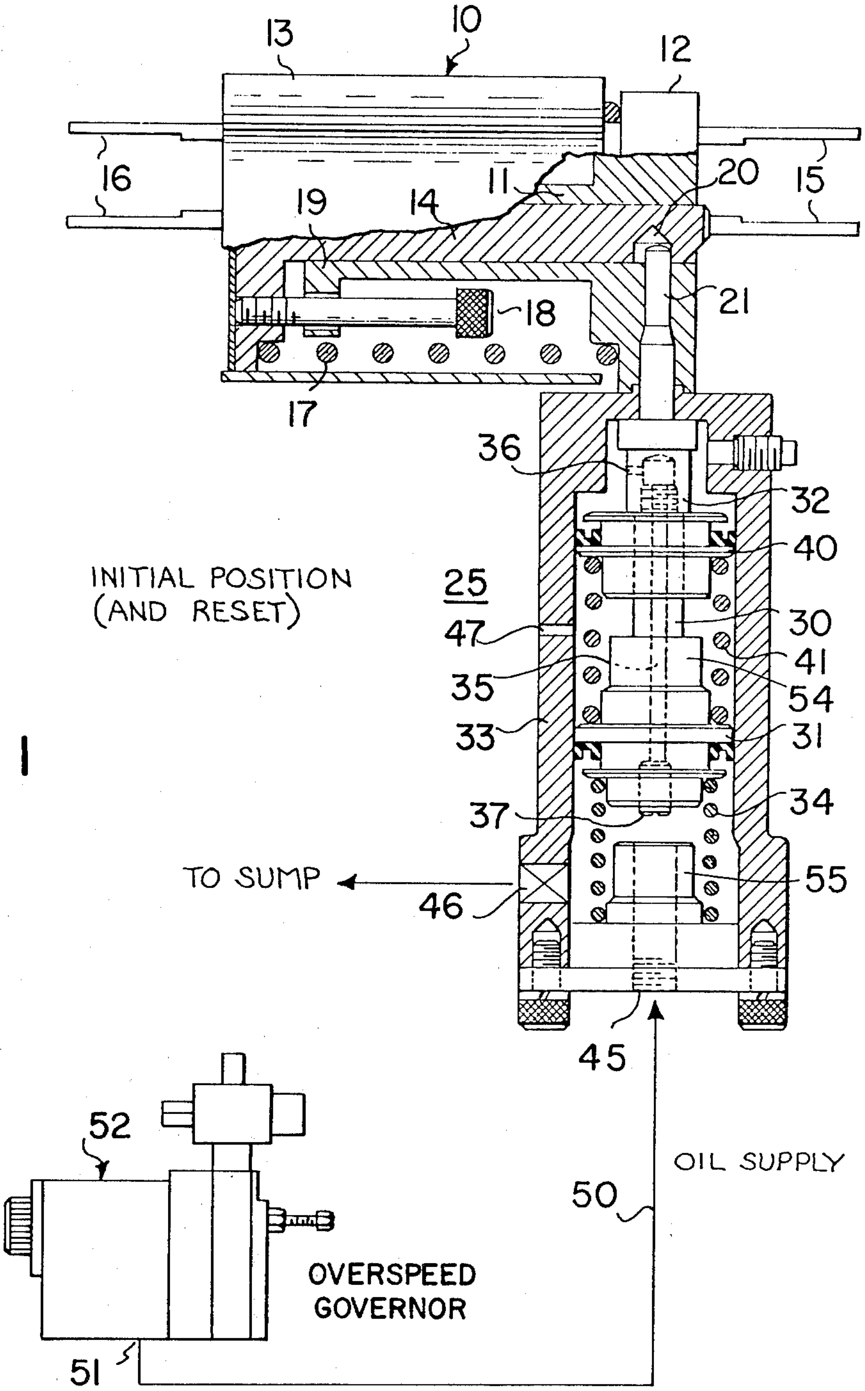
FIG. 1 is a cross sectional view of a hydraulic actuator emboding the present invention connected in latch releasing association with a spring-actuated expandable link normally latched in a contracted condition, with the actuator shown in its initial (and reset) state.

As indicated above, a practical embodiment of the invention is useful as a latch releasing device for a normally latched spring-actuated expandable overspeed link 10. The link 10 comprises a tubular sleeve 11 fixed in an annular end plate 12 and a tubular cup 13 having fixed in its base an axial rod 14 which is slidably mounted in the sleeve 11. The cup 13 and the end plate 12 are provided externally with clevises 15, 16 for coupling the link 10 in an engine fuel linkage or any other desired mechanism. A compression spring 17 between the end plate 12 and the base of the cup-like housing 13 biases the end plate and housing to axially spaced apart positions, thereby tending to increase spacing between the two clevises 15, 16. Such axial extension is limited by one or more stop bolts 18 mounted in the base of the housing cup 13 and passing through peripheral apertures in an annular flange 19 at the free end of sleeve 11. The slidable rod 14 is notched at its free end, as at 20, to engage a releasable pin 21 of a hydraulic latch actuator 25, thereby normally to restrain the expandable link 10 in a contracted or cocked condition with its spring 17 compressed as shown at FIG. 1. Once unlatched and extended, this link is intended to be restored to its contracted state by external manually operable resetting means (not shown).

In the hydraulic actuator 25, the output pin 21 constitutes an upper end extension of a latch member comprising a piston rod 30 having at its lower end a main actuating piston 31 and an intermediate annual shoulder or abutment 32. The piston 31 is slidably mounted within a cylindrical housing 33 and biased upwardly (as shown in the drawings) by a reset spring 34 to bring the pin 21 into latching relation with the spring actuated axial rod 14 in the expandable link 10. The piston 31 and piston rod 30 are provided with an axial fluid passage 35 terminating at its upper end in a radial outlet port 36 in the annual shoulder 32. Thus the port 36 is disposed outside the space between the abutment 32 and the piston 31. At its lower end the fluid passage 35 terminates in a constricted metering orifice 37 opening into a fluid pressure chamber inside the housing 33. This chamber is defined by the actuating piston 31 and the lower end of the hydraulic cylinder 33.

Slidably mounted upon the piston rod 30 within the hydraulic cylinder 33, and axially movable between actuating piston 31 and the abutment 32, is an auxiliary, or floating, piston 40. The piston 40 serves as a floating abutment for a helical compression spring 41 (hereinafter referred to as an actuating or trip spring) which bears at its other end upon the upper side of the actuating piston 31. The spring 41 biases the floating piston 40 to a limiting position against the annular abutment 32 in which position the pistons 31 and 40 are axially spaced apart from one another. The spring 41 is sufficiently strong to overcome the opposing upward force of the reset spring 34. As will become evident, it acts to move the piston 31 and pin 21 downward in tripping operation.

The hydraulic cylinder 33 of the latch actuator 25 is suitably mounted on a sidewall of the end plate 12 of the expandable link 10. At its lower end the cylinder 33 is provided with an axial fluid inlet port 45 and a pressure relief valve 46. The axial fluid passage 35 in the piston rod 30 interconnects the lower hydraulic chamber of cylinder 33 beneath piston 31 and another fluid pressure chamber above piston 40. The upper chamber is defined by the floating piston 40 and the adjacent end of the cylinder 33. A vent 47 is provided in the wall of cylinder 33 between the pistons 31 and 40 to ensure that free movement of these pistons is not impeded by air pressure building up in the interpiston space.

By way of illustration, in FIG. 1 the fluid inlet port 45 is shown connected through a conduit 50 to a fluid outlet port 51 of an engine overspeed governor 52, and the relief valve 46 of actuator cylinder 33 is connected to the engine sump. The engine overspeed governor 52 is arranged to provide at port 51 positive hydraulic pressure which varies with the speed of the protected engine (not shown) while the engine is running at any speed within a normal range. At some predetermined overspeed the governor 52 effects an abrupt drop in pressure at port 51, as by opening the port to atmospheric pressure. Such overspeed governor operation is well known to those skilled in the art and is described in the above-referenced concurrently filed patent application of P. M. Folger and B. L. Johnson.

Figure 2:
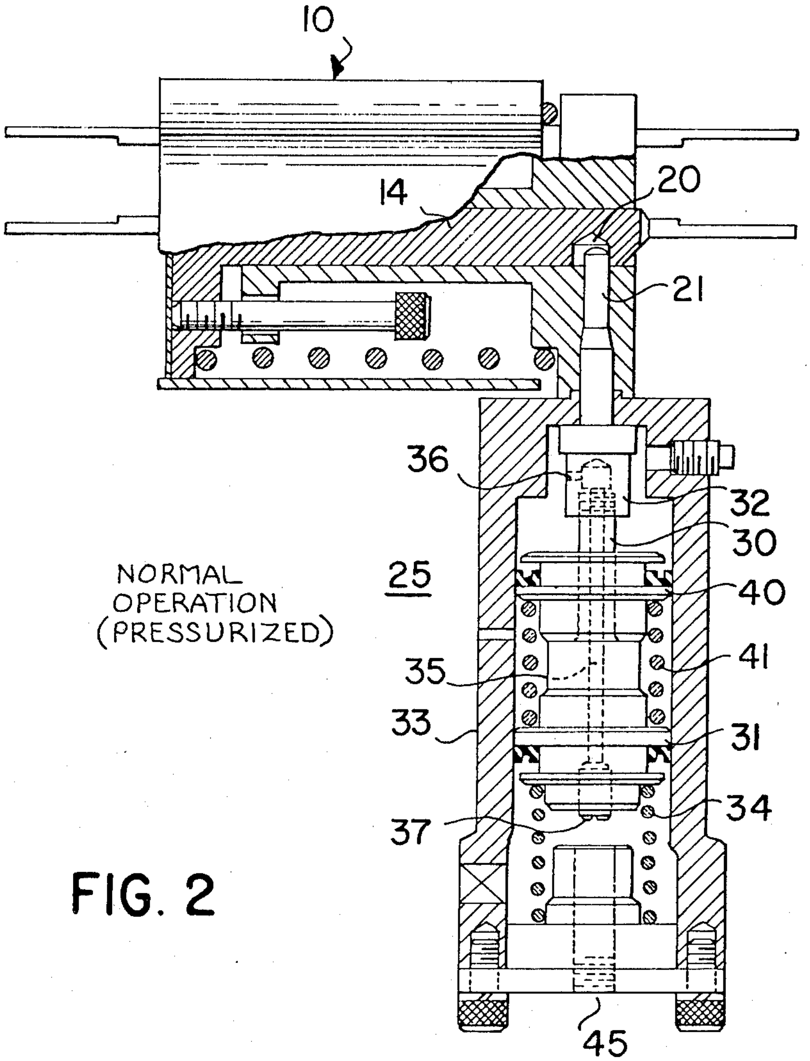
FIG. 2 is a cross sectional view of the actuator and link with the actuator in its normal pressurized or cocked operating position.

In FIG. 1, the hydraulic latch actuator 25 is shown in its initial unpressurized condition, which is also its reset condition following a tripping operation and reset of the expandable link 10. The latch member 21, 30–32 is urged by the reset spring 34 to a limiting position wherein the abutment 32 engages the upper end of the cylinder 33. If now the engine is brought up to speed so that oil under pressure is supplied from the overspeed governor 52, the actuator inlet port 45 admits this pressurized fluid to the lower chamber of the cylinder 33. The fluid fills the lower chamber and is communicated through the metering aperture 37, the axial passage 35, and the radial passage 36 to the upper chamber above the floating piston 40. Because of the constricted metering orifice 37, equalization of pressure below the piston 31 and above the piston 40 is slightly delayed, but during this equalization the greater fluid pressure below the piston 31 and the reset spring 34 retain the latching pin 21 in the latching notch 20. As the fluid pressure above the floating piston 40 rises, it pushes the piston 40 downward along the rod 30 and into engagement with a collar 54 of piston 31, as shown at FIG. 2. In this pressurized condition of the hydraulic actuator 25, the piston 31 and latch pin 21 are retained in their upper latching positions, while the floating piston 40 is pressed downward along the rod 30 and into engagement with the piston 31, thereby to compress and charge the actuating spring 41. This is the final pressurized or cocked operating position of the actuator 25, with fluid pressure (e.g., approximately 300 PSI) equalized below the piston 31 and above the piston 40.

If now fluid pressure at the inlet port 45 of the actuator 24 is abruptly reduced, as by operation of the overspeed governor in connecting its output port 51 to the sump, fluid pressure below the piston 31 (FIG. 1) is suddenly brought to zero or significantly reduced, while reduction of pressure above the piston 40 is delayed by the action of the metering orifice 37. The actuating spring 41 between the pistons 31 and 40, therefore, acts immediately to move the piston 31 downward while the piston 40 is still held against movement by fluid pressure in the upper chamber of cylinder 33. Consequently the latch member 21, 30–32 is quickly moved to the limiting position shown in FIG. 3, in which position the actuating piston 31 engages an upstanding abutment 55 located at the lower end of the cylinder 33. The axial dimensions of the abutment 55 and of the piston collar 54 are coordinated so that the distance traveled by the latch member approximately equals the maximum spacing d (FIG. 3) between the actuating and floating pistons 31 and 40, respectively.

Figure 3:
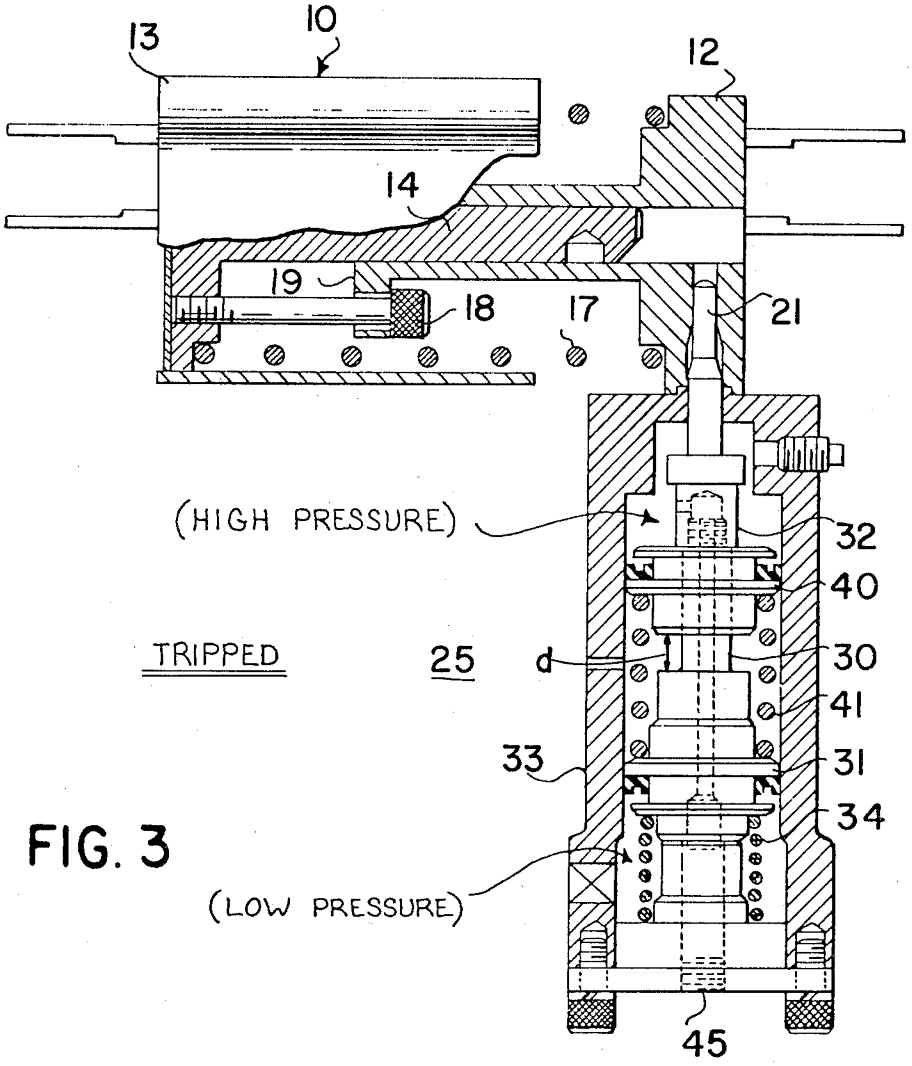
FIG. 3 is a cross sectional view of the actuator and link in instantaneous position immediately after a tripping operation and prior to reset.

The above-described downward movement of piston 31 from FIG. 2 to FIG. 3 positions will move the latch pin 21 to its unlatching position and release the spring actuated expandable overspeed link 10 for axial extension to the "open" condition shown in FIG. 3. In a practical embodiment of the invention, a force of 60 pounds is required to pull pin 21 out of the notch 20 in the spring-loaded slidable rod 14 of link 10, and the trip spring 41 was made twice that strong. The reaction time of the described components is so fast that the link 10 attains its extended condition in only a small fraction of a second after the overspeed governor senses an engine overspeed.

Following such instantaneous latch releasing action, fluid pressure above the floating piston 40 of the actuator 25 is gradually reduced through the metering orifice 37, so that the reset spring 34 can lift the latch member 21, 30–32 and the floating piston 40 as a unit to a reset position which is the same as the initial position (FIG. 1) of these parts. With substantially equal oil pressures in the chamber above piston 40 and in the chamber below piston 31, this automatic resetting action of the spring 34 is augmented by a net upwardly directed hydraulic force due to the exposed area of the lower face of piston 31 being larger than that of the upper annular face of piston 40. Once the actuator 25 is reset, the latch pin 21 is in a raised position in which it will recapture the slidable rod 14 of the overspeed link 10 whenever the latter component is returned to its normal contracted or "closed" condition by manual operation of a reset lever in the engine fuel linkage (not shown) to which this link is coupled. Upon manually resetting the link 10, its rod 14 is moved from the FIG. 3 position to the FIG. 1 position; in the process the latch pin 21 (and associated parts) of the actuator 25 rides down the inclined free end of the rod 14 and then snaps back into its latched position (FIG. 1) under the influence of the reset spring 34.

It may now be observed that the hydraulic actuator 25 is automatically resettable whether or not normal positive fluid pressure at inlet port 45 is restored. If such pressure is not restored, pressure below the piston 31 and above the piston 40 will equalize at substantially zero and the parts will return to the reset position shown at FIG. 1. Subsequently, whenever fluid pressure is restored at the inlet port 45, fluid traverses the passage 35 with some slight delay and again equalizes the pressure above piston 40 with that below piston 31 so that the reset spring 34 is equally effective. The floating piston 40 then returns to the lower position of FIG. 2, thereby cocking or charging the trip spring 41.

It will now also be apparent to those skilled in the art that the latch actuator 25 has the unique and desirable feature of being unresponsive to normal shutdown of the associated engine. Upon stopping the engine by normal operation of its throttle-controlled main governor, engine speed decreases gradually and the corresponding decrease in hydraulic pressure at the inlet port 45 of the actuator 25 will also be gradual, not abrupt. For example, the transition from full pressure to zero pressure may take approximately 30 seconds. The small orifice 37 in the fluid passage 35 between the lower and upper chambers of the actuator cylinder 33 is sufficiently large to permit such a slow loss of pressure in the upper chamber, and consequently the pressure will drop substantially uniformly in both chambers. With decreasing but equalized oil pressure below the piston 31 and above the piston 40, the latch member 21, 30, 31 of the actuator is maintained in a latched position (FIGS. 1 and 2) while the piston 40 is able to float upwardly from its position in FIG. 2 toward its position in FIG. 1. Consequently the actuating spring 41 is uncocked or discharged without unlatching or tripping the overspeed link 10 during such gradual reductions of hydraulic pressure.

While a preferred embodiment of the invention has been described and illustrated by way of illustration, many modifications will occur to those skilled in the art, and therefore the appended claims are intended to cover all such modifications as fall within the true spirit and scope of the invention.

I claim:

1. A fluid pressure responsive actuator comprising a piston housing, an actuating piston and piston rod slidably mounted within said housing and having an actuating portion extending through said housing, said rod having a peripheral abutment within said housing spaced from said actuating piston, said actuating piston and rod having a constricted axial fluid passage therethrough with one end of said passage terminating in a lateral fluid port in a portion of said rod inside said housing but outside the space between said abutment and actuating piston, a floating piston slidably mounted on said rod intermediate said abutment and said actuating piston, said abutment and actuating piston constituting limiting stops for movement of said floating piston in opposite directions on said piston rod, an actuating spring within said housing biasing said actuating and floating pistons into spaced apart relationship on said rod, a reset spring biasing said actuating piston toward one end of said housing with a force less than the force of said actuating spring, and means for admitting fluid under pressure to a chamber formed between said actuating piston and the other end of said housing, whereby upon abrupt reduction of fluid pressure in said chamber said actuating piston and rod are quickly moved by said actuating spring to a limiting positon at said other end of said housing and then returned by said reset spring to a limiting position at said one end of said housing independently of restoration of fluid pressure in said chamber.

2. An actuator according to claim 1 wherein said piston rod extends axially through said one end of said housing and said fluid admitting means is adapted to be coupled to a source of hydraulic fluid under variable pressure.

3. An actuator according to claim 1 wherein said peripheral abutment is laterally spaced from said housing in all positions of said actuating piston.

4. An actuator according to claim 1 including a limiting abutment at said other end of said housing positioned to limit movement of said actuating piston to a distance approximately equal to the maximum spacing between said actuating and floating pistons.

5. An actuator according to claim 1 wherein said housing has an outlet port that vents space between said actuating and floating pistons.

6. A fluid pressure response actuator comprising a hydraulic cylinder having first and second ends, an actuating piston and rod mounted for limited reciprocal movement in said cylinder and coupled to an external actuating member, said actuating piston and said first end of said cylinder defining a first fluid pressure chamber inside said cylinder, a floating piston slidably mounted on said rod within said cylinder for limited axial movement relative to said actuating piston, said floating piston and said second end of said cylinder defining a second fluid pressure chamber inside said cylinder, a constricted fluid passage in said actuating piston and rod interconnecting said first and second pressure chambers, a fluid inlet port in said cylinder positioned to admit hydraulic fluid to said first chamber, high-power spring means for biasing said pistons apart from one another, and relatively low-power spring means for biasing said actuating piston in opposing relation to said high-power spring means.

7. In combination, a spring-actuated expandable link having a predetermined normal length and being spring biased to a different length, releasable latching means normally restraining said link in its normal-length condition, and hydraulic latch actuating means adapted to be normally supplied with hydraulic fluid under pressure and being operative to release said latching means in response to an abrupt reduction of fluid pressure, said actuating means comprising a hydraulic cylinder having a fluid inlet port, a main piston and a piston rod in said cylinder, means for connecting said main piston and rod to said latching means, means for biasing said main piston and rod to a first position in which said latching means is effective to restrain said link in its normal-length condition, a fluid passage through said main piston and rod including a constricted fluid metering orifice, a floating piston mounted for axial movement on said piston rod in said cylinder, and an actuating spring connected to both said main and floating pistons to bias said floating piston toward a predetermined position on said rod, said floating piston being moved by hydraulic pressure in said cylinder to another position in which said actuating spring is charged, and said actuating spring being operative in response to an abrupt drop of hydraulic pressure at said inlet port to move said main piston and rod to a second position in which said latching means is ineffective to restrain said expandable link in said normal-length condition.

8. The combination according to claim 7 in which said cylinder has first and second ends, said inlet port admits hydraulic fluid into a first chamber formed by said main piston and said first end of said cylinder, said fluid passage extends between said first chamber and a second chamber formed by said floating piston and said second end of said cylinder, said actuating spring is disposed in compression between said main and floating pistons, said biasing means urges said main piston and rod toward said second end of said cylinder, and said orifice prevents any rapid change of hydraulic pressure in said second chamber.

* * * * *